United States Patent [19]
Edwards

[11] Patent Number: 5,345,377
[45] Date of Patent: Sep. 6, 1994

[54] HARMONIC CONTROLLER FOR AN ACTIVE POWER LINE CONDITIONER

[75] Inventor: Charles W. Edwards, Monroeville, Pa.

[73] Assignee: Electric Power Research Institute, Inc., Palo Alto, Calif.

[21] Appl. No.: 968,847

[22] Filed: Oct. 30, 1992

[51] Int. Cl.⁵ .................... H02M 1/12; G05F 1/70
[52] U.S. Cl. ........................ 363/71; 363/40; 323/207; 307/105
[58] Field of Search ........... 363/35, 37, 40, 41, 363/71, 97, 98; 323/205, 207, 208, 209, 210; 307/105; 318/798, 803, 805–812; H02M 1/12, 5/40; G05F 1/70

[56] References Cited

U.S. PATENT DOCUMENTS

| | | |
|---|---|---|
| 3,863,140 | 1/1975 | Easter et al. |
| 4,063,144 | 12/1977 | Hucker et al. |
| 4,410,935 | 10/1983 | Dang |
| 4,460,834 | 7/1984 | Gottfried |
| 4,473,756 | 9/1984 | Brigden et al. |
| 4,564,767 | 1/1986 | Charych |
| 4,651,265 | 3/1987 | Stacey et al. |
| 4,686,375 | 8/1987 | Gottfried |
| 4,713,745 | 12/1987 | Schauder |
| 4,728,808 | 3/1988 | Bet-Esh et al. |
| 4,800,326 | 1/1989 | Unsworth |
| 4,811,236 | 3/1989 | Brennen et al. |
| 4,812,779 | 3/1989 | Wagner |
| 4,814,683 | 3/1989 | Okamoto et al. |
| 4,827,150 | 5/1989 | Reynal |
| 4,835,454 | 5/1989 | White |
| 4,862,054 | 8/1989 | Schauder |
| 4,876,460 | 10/1989 | Johnson |
| 4,937,720 | 6/1990 | Kirchberg |
| 4,943,783 | 7/1990 | Nojima |
| 4,962,339 | 10/1990 | Schauder |
| 4,962,976 | 10/1990 | Takahashi et al. |
| 4,980,812 | 12/1990 | Johnson et al. |
| 4,994,956 | 2/1991 | Kirchberg et al. |
| 4,996,462 | 2/1991 | Krummel |
| 5,001,619 | 3/1991 | Nakajima et al. |
| 5,016,157 | 5/1991 | Rozman et al. |
| 5,038,092 | 8/1991 | Asano et al. |
| 5,047,909 | 9/1991 | Hosoda |
| 5,047,910 | 9/1991 | Levran et al. |
| 5,047,914 | 9/1991 | Dhyanchand et al. |
| 5,051,704 | 9/1991 | Chapman et al. |
| 5,075,634 | 12/1991 | French |
| 5,077,532 | 12/1991 | Obermann et al. |
| 5,187,427 | 2/1993 | Erdman .................. 323/207 |

*Primary Examiner*—Emanuel T. Voeltz
*Attorney, Agent, or Firm*—Flehr, Hohbach, Test, Albritton & Herbert

[57] ABSTRACT

An apparatus and method of constructing a sinusoidal output signal corresponding to a selected harmonic of a sinusoidal input signal is described. The input signal is deconstructed into direct and quadrature components by respectively multiplying it with a selected harmonic of cosine and sine reference signals. The direct and quadrature components contain orthogonal dc components corresponding to the direct and quadrature magnitudes of the input signal at the selected harmonic frequency. The generated direct and quadrature magnitude values are respectively applied to error amplifiers in accordance with the invention. The outputs of the error amplifiers are respectively multiplied by the selected harmonic component of the sine and cosine reference signals. This provides the proper phase values for the respective quadrature and direct processed signals at the selected harmonic frequency. The processed quadrature and direct signals are then summed to yield an output signal which corresponds to the magnitude and phase values of the selected harmonic of the input signal.

12 Claims, 8 Drawing Sheets

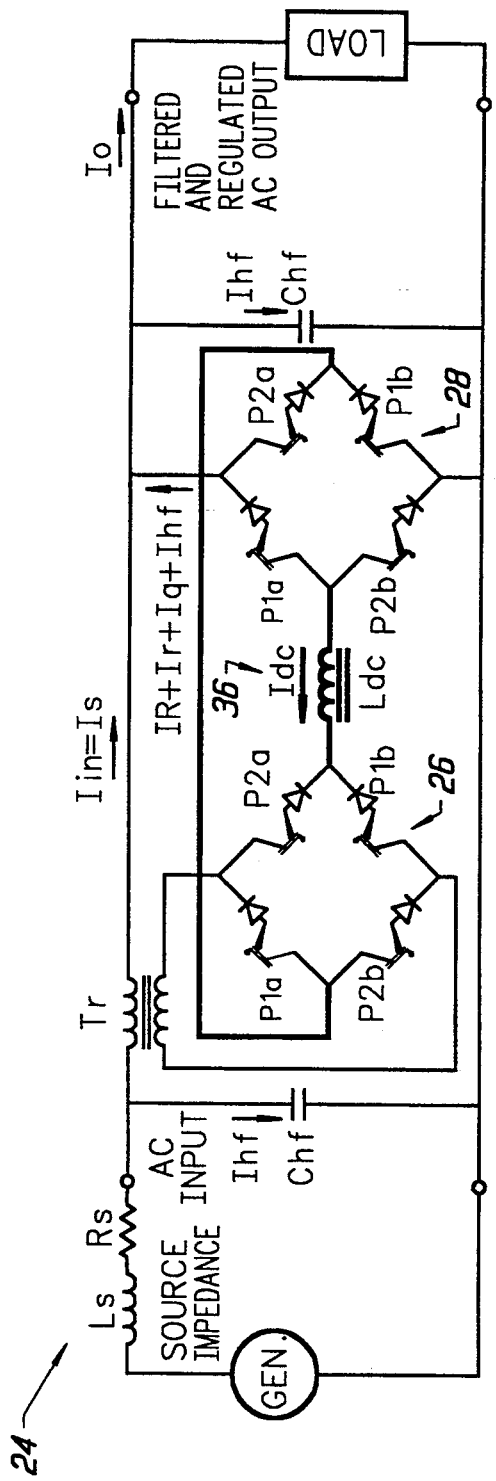
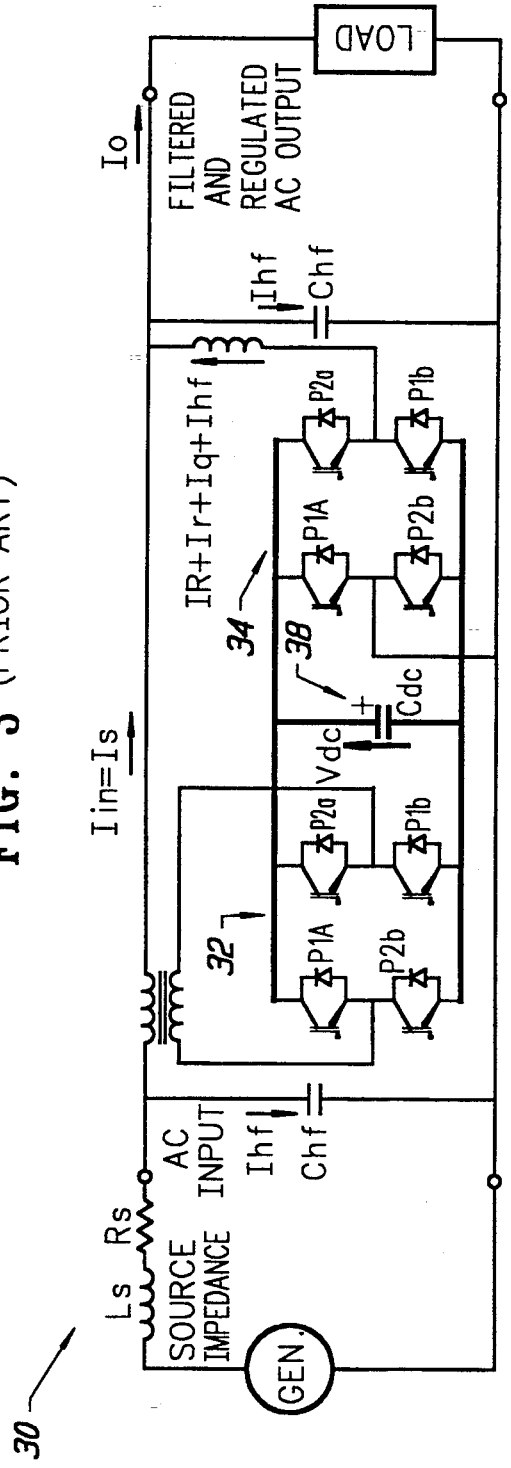
FIG. 3 (PRIOR ART)
FIG. 4 (PRIOR ART)

HARMONIC CONTROLLER FOR AN ACTIVE POWER LINE CONDITIONER

The present application is related to the following commonly assigned applications:

Active Power Line Conditioner with Synchronous Transformation Control, filed Oct. 30, 1992, Ser. No. 07/968,850;

Active Power Line Conditioner with Fundamental Negative Sequence Comepnsation, filed Oct. 30, 1992, Ser. No. 07/969,932;

Active Power Line Conditioner with Fast Dynamic Response, filed Oct. 30, 1992, Ser. No. 07/969,344;

Highly Fault Tolerant Active Power Line Conditioner, filed Oct. 30, 1992, Ser. No. 07/969,772;

Active Power Line Conditioner with Low Cost Surge Protection, filed Oct. 30, 1992, Ser. No. 07/969,137;

Load Current Fundamental Filter with One Cycle Response, filed Oct. 30, 1992, Ser. No. 07/969,081; and Low Cost Active Power Line Conditioner, filed Mar. 12, 1993, Ser. No. 08/030,783.

BRIEF DESCRIPTION OF THE INVENTION

This invention relates generally to a method and apparatus for providing low distortion power signals. This invention more particularly relates to an apparatus and method to eliminate selected harmonic amplitude and phase errors within a power signal processed by an active power line conditioner.

BACKGROUND OF THE INVENTION

Power electronic circuits are used to control and condition electric power. For instance, power electronic circuits may be used to convert a direct current into an alternating current, to change voltage or current magnitude, or to change the frequency of an alternating current.

An inverter is a power electronic circuit which receives a dc source signal and converts it into an ac output signal. Harmonic neutralization and pulse-width modulation techniques are used to generate the ac signal. Harmonic neutralization involves a combination of several phase-shifted square-wave inverters, each switching at the fundamental frequency. Pulse-width modulation involves switching a single inverter at a frequency many times higher than the fundamental.

Filters can be classified according to whether their main purpose is to improve the power waveform or to remove EMI. Filters for waveform improvement usually deal with frequencies in the audio range. EMI filters are usually concerned with frequencies of 455 kHz or higher.

Passive filters are typically used to eliminate undesirable harmonics from the inverter output. Unfortunately, passive filters do not provide continuous harmonic filtering on pulsating or randomly varying loads. This occurs because passive filters only adapt to new harmonic levels after a considerable settling delay.

Passive filters tend to be large, heavy, costly, and, in general, highly load-dependent. Consequently, passive filters frequently represent a substantial part of the total cost, weight, and size of power electronics equipment.

Active filters represent an emerging technology without many of the shortcomings associated with passive filters. The technology relies upon the theory of active-feedback filters. A feedback loop and an inverter with a single energy-storage element (an inductor or capacitor) is used to minimize the difference between the actual waveform and the desired waveform.

The urgency of developing successful active power filters has recently grown in view of the increasing waveform distortion of both voltages and currents in ac power distribution systems. These distortions are largely attributable to a growing number of nonlinear loads in the electric utility power network. Typical nonlinear loads are computer controlled data processing equipment, numerical controlled machines, variable speed motor drives, robotics, medical and communication equipment.

Nonlinear loads draw square wave or pulse-like currents instead of purely sinusoidal currents drawn by conventional linear loads. As a result, nonlinear current flows through the predominantly inductive source impedance of the electric supply network. Consequently, a non-linear load causes load harmonics and reactive power to flow back into the power source. This results in unacceptable voltage harmonics and load interaction in the electric power distribution in spite of the existence of voltage regulators.

The degree of current or voltage distortion can be expressed in terms of the relative magnitudes of harmonics in the waveforms. Total Harmonic Distortion (THD) is one of the accepted standards for measuring voltage or current quality in the electric power industry.

Apart from voltage and current distortion, another related problem may arise when nonlinear loads are connected to the electric power network. In particular, when the load current contains large amounts of third or other triplen harmonics, the harmonic current tends to flow in the neutral conductor of the power system. Under these conditions, the neutral current can exceed the rated current of the neutral conductor. Since the neutral is normally designed to carry only a fraction of the line current, overheating or even electric fires can result.

As previously indicated, active filters may be used to alleviate these problems. Active filters, or active power line conditioners (APLCs) comprise one or two pulse width modulated inverters in a series, parallel, or series-parallel configuration. The inverters share a common dc link, which can be a dc inductor (current link) or a dc capacitor (voltage link). It is advantageous to keep the energy stored in the dc link (capacitor voltage or inductor current) at an essentially constant value. The voltage on the dc link capacitor can be regulated by injecting a small amount of real current into the dc link. The injected current covers the switching and conduction losses inside the APLC. The link voltage control can be performed by the parallel inverter.

The basic active load current compensation with current or voltage source filters is known. FIG. 1 depicts a parallel connected current source active filter 20, and FIG. 2 depicts a parallel connected voltage source active filter 22. The load current $I_L$ consists of three components: The real current, $I_r$, the reactive current, $I_q$, and the ripple current, $I_R$. The parallel connected active filter supplies the $I_R$ and $I_q$ components, and, also, a small residual "high frequency" component $I_{hf}$, that flows into the parallel connected "high frequency" capacitor $C_{hf}$. The parallel connected active filter is essentially a single phase inverter which is operated from an isolated current or voltage source.

The realization of the active filter requires solid state switches with intrinsic turn-off capability (transistors, IGBTs, MOSFETs, GTOs, etc.). Switch pairs P1 and P2 are alternately turned ON or OFF. The average voltage required in the link capacitor, $V_{dc}$, of FIG. 2, is supplied by the ac source. Real power can be absorbed by introducing an appropriate amount of offset in the symmetry of the on-times in switches P1 and P2. The polarity of the offset is coordinated with the polarity of the input voltage. When switches P1 of FIG. 2 are on, a current is generated between the tie inductor, Lp, the output capacitance dominated by $C_{hf}$, and the difference between the dc link and ac output voltages. Conversely, when the P2 switch pair is on, the current is driven by the sum of the dc link and ac output voltages.

The real power, necessary to maintain the selected dc link voltage magnitude, Vdc, is proportional to the average duty cycle of high-frequency pole switchings in any given half line voltage cycle. The isolated dc link voltage is regulated by a closed loop controller that affects the average pole switching symmetry. Reactive inverter currents can be produced that flow in or out of the inverter by temporary changes in the duty cycle of inverter pole switchings. The instantaneous magnitudes of inverter currents are regulated so that they provide the load compensation current requirements. For example, if a positive ripple current is detected, the on-time of P2 is increased with respect to P1. The increase results in the required net compensating ripple current flowing in the ac line. This also implies that the amplitude of Vdc must be kept higher than the highest value of the ac voltage across the load, otherwise, the instantaneous compensation capability of the active filter is impaired.

The rapid pulse width modulation switching in the active filter produces a high frequency, triangular shaped current, $I_{hf}$, an undesired side effect. The effect of the $I_{hf}$ signal is a small, superimposed triangular voltage ripple on the ac voltage. The amplitude of the voltage ripple is inversely proportional to the pole switching (carrier) frequency and the value of $C_{hf}$. The voltage ripple is filtered with a parallel capacitor $C_{hf}$.

When the active power filter (20 or 22) is connected across the load, a high degree of filtering of the terminal voltage is observed. Note that the active power filter is not capable of supplying or absorbing any real power other than that which is needed to compensate for losses inside the filter itself. It will, however, readily compensate reactive currents, non-synchronous and non-theoretical harmonics and sources with variable or unregulated frequency. The shunt connected power circuit is inherently protected under load short circuits since the load fault current bypasses the active power filter.

The isolated dc link circuits of FIGS. 1 and 2 can be combined to produce an ac line conditioner and voltage regulator. FIG. 3 depicts a shared link current source active power filter 24 with a serial inverter 26 and a parallel inverter 28. FIG. 4 depicts a shared link voltage source active power filter 30, with a serial inverter 32, and a parallel inverter 34. The respective series and parallel inverters are similar to the filters described in relation to FIG. 1 and 2. The shared link approach of FIGS. 3 and 4 represents a combination of series and shunt connected filters which are operated from a common shared direct voltage (or current) source.

The shared link circuit topology removes the former limitation of the active power filter, namely, that it is not capable of supplying or absorbing any real power, apart from compensating for the losses in the active power filter itself. In the shared dc link series and parallel circuit topology, it becomes possible for both the series and the parallel filter element to absorb or generate real power at the fundamental frequency, or other frequencies, provided the total power absorbed equals the total power generated.

The series active elements (26 and 32) may be modulated to provide a fundamental voltage of controllable magnitude and phase so that the phase and magnitude of the ac output voltage stays sinusoidal at any required level and phase angle with respect to the ac input. The power required by the series element (26 or 32) is absorbed from or injected into the dc link (36 or 38). Link energy is then maintained by appropriately controlling the phase and magnitude of the fundamental modulating signal applied to the parallel connected element (28 or 34). The result is that the power needed by the series element (26 or 32) will be obtained from the parallel element (28 or 34). Similarly, power generated by the series element (26 or 32) will be returned into the ac output by the parallel element (28 or 34).

When the output and input voltages are not equal, the series inverter (26 or 32) delivers real power to or from the dc link (26 or 38). The amount of power exchange delivered with respect to the output power depends on the fundamental Vo/Vin ratio. When the Vo/Vin ratio is smaller than unity, the real part of the input current becomes larger than the output (load) real current. The difference between the output and input currents flows through both inverters via the dc link (36 or 38). Appropriate fast-acting controls insure that the power flow between the series and parallel inverters is kept equal on the average, so that the power flow does not significantly alter the stored energy in the shared dc link.

In addition to the regulation of the buck/boost power transfer, the parallel active element (28 or 34) is modulated at ripple frequency so that it provides a bypass for load generated ripple currents and, if required, for the reactive fundamental current of the load. After full compensation of ripple and reactive components, only real fundamental current is drawn from the ac input.

The output signal of prior art active power line conditioners frequently includes amplitude and phase errors of the fundamental and of harmonics of the fundamental. Thus, it would be desirable to provide a controller which nulls amplitude and phase errors at selected frequencies. Conventional control techniques which rely upon proportional, integral, and/or derivative gains are inadequate to achieve these levels of waveform quality.

OBJECTS AND SUMMARY OF THE INVENTION

It is a general object of the present invention to provide an improved active power line conditioner.

It is another object of the invention to provide an active power line conditioner which employs a parallel filter to compensate for nonlinear load current harmonics to produce distortion-free sinusoidal output voltages.

It is a more particular object of the invention to provide an apparatus and method to eliminate selected harmonic amplitude and phase errors within a power signal processed by an active power line conditioner.

These and other objects are achieved by the present invention which provides an apparatus and method of constructing a sinusoidal output signal corresponding to a selected harmonic of a sinusoidal input signal. The input signal is de-constructed into direct and quadrature components by respectively multiplying it with a selected harmonic of cosine and sine reference signals. The direct and quadrature components contain orthogonal dc components corresponding to the direct and quadrature magnitudes of the input signal at the selected harmonic frequency. The generated direct and quadrature magnitude values are respectively applied to error amplifiers in accordance with the invention. The outputs of the error amplifiers are respectively multiplied by the selected harmonic component of the sine and cosine reference signals. This provides the proper phase values for the respective quadrature and direct processed signals at the selected harmonic frequency. The processed quadrature and direct signals are then summed to yield an output signal which corresponds to the magnitude and phase values of the selected harmonic of the input signal.

BRIEF DESCRIPTION OF THE DRAWINGS

For a better understanding of the nature and objects of the invention, reference should be made to the following detailed description taken in conjunction with the accompanying drawings, in which:

FIG. 3 is a shared link current source active power filter in accordance with the prior art.

FIG. 4 is a shared link voltage source active power filter in accordance with the prior art.

Like reference numerals refer to corresponding parts throughout the several views of the drawings.

DETAILED DESCRIPTION OF THE INVENTION

Figure 1:
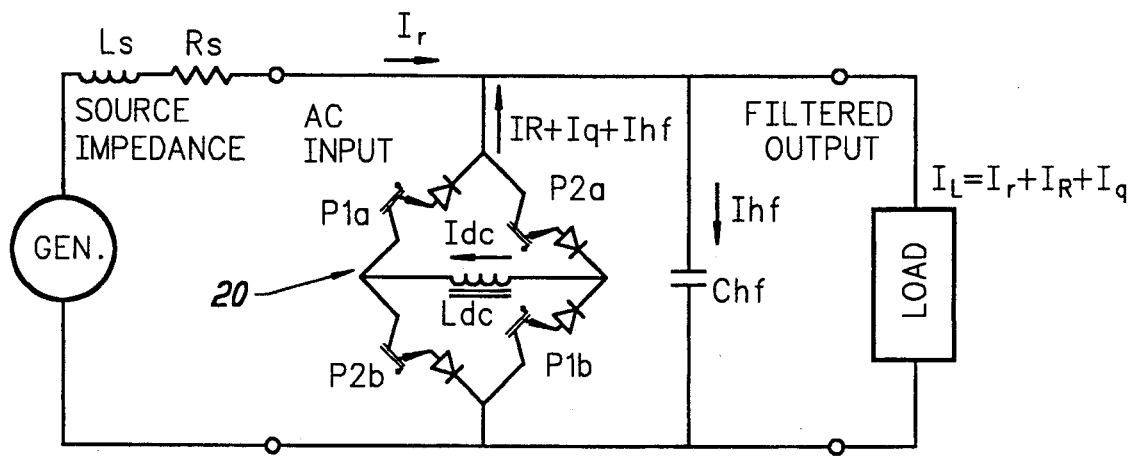
FIG. 1 is a parallel connected current source active filter in accordance with the prior art.
Figure 2:
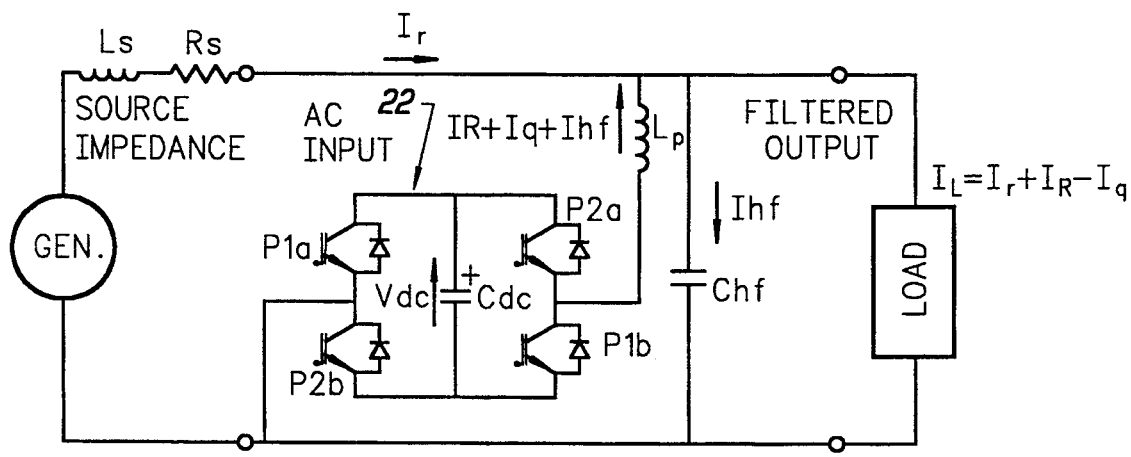
FIG. 2 is a parallel connected voltage source active filter in accordance with the prior art.
Figure 5:
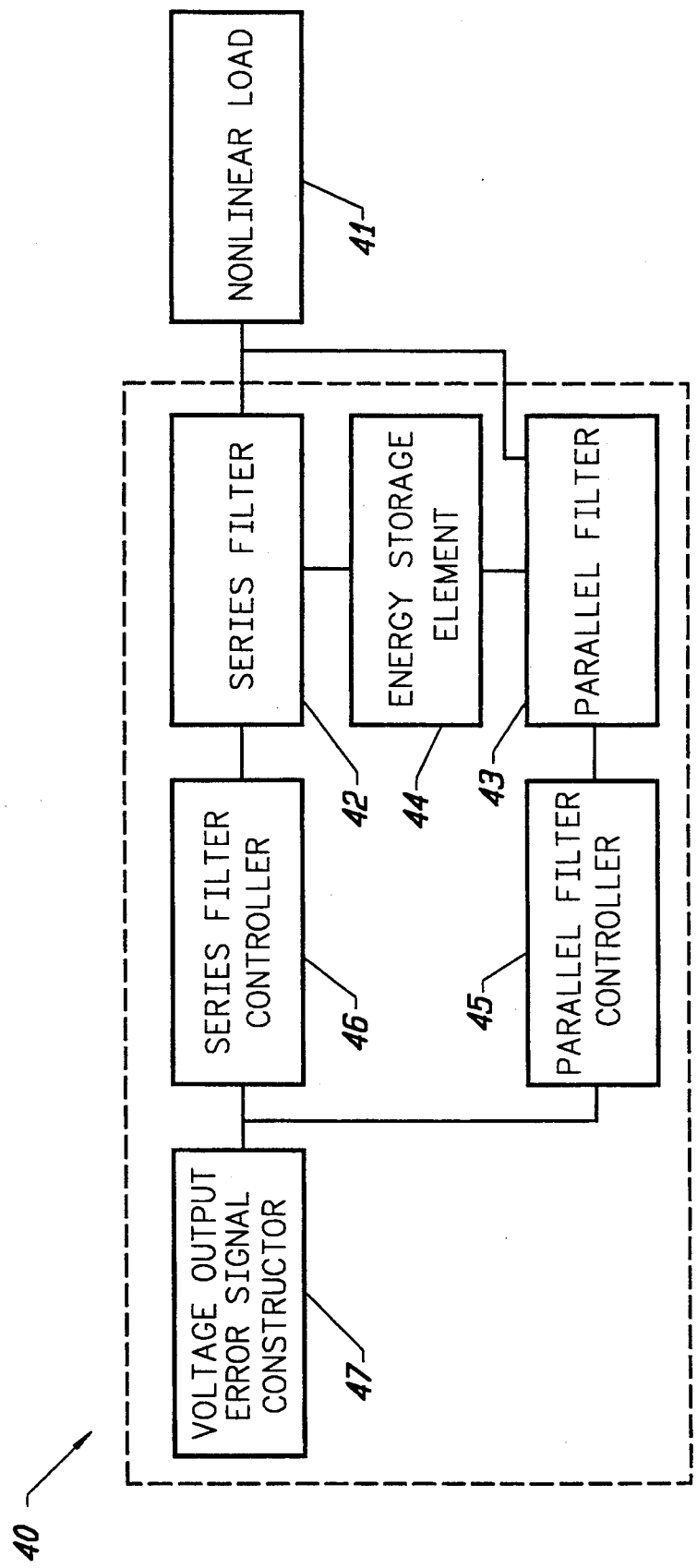
FIG. 5 is a block diagram of an active power line conditioner with a parallel filter controller incorporating the harmonic controller of the invention.

FIG. 5 is a simplified depiction of an active power line conditioner 40 incorporating the harmonic controller of the present invention. The active power line conditioner 40 delivers conditioned power to a nonlinear load 41. The active power line conditioner 40 includes a series filter 42 coupled to a parallel filter 43 through an energy storage element 44. The series filter 32, parallel filter 34 and dc link capacitor 38 of FIG. 4 may be used in conjunction with the present invention.

A parallel filter controller 45 governs the operation of the parallel filter 43. The parallel filter controller 45 includes harmonic controllers in accordance with the invention, as will be described below. A series filter controller 46 is used to regulate the operation of the series filter 42. The series filter controller 46 and the parallel filter controller 45 receive and process a voltage output error signal from voltage output error signal constructor 47.

Figure 6:
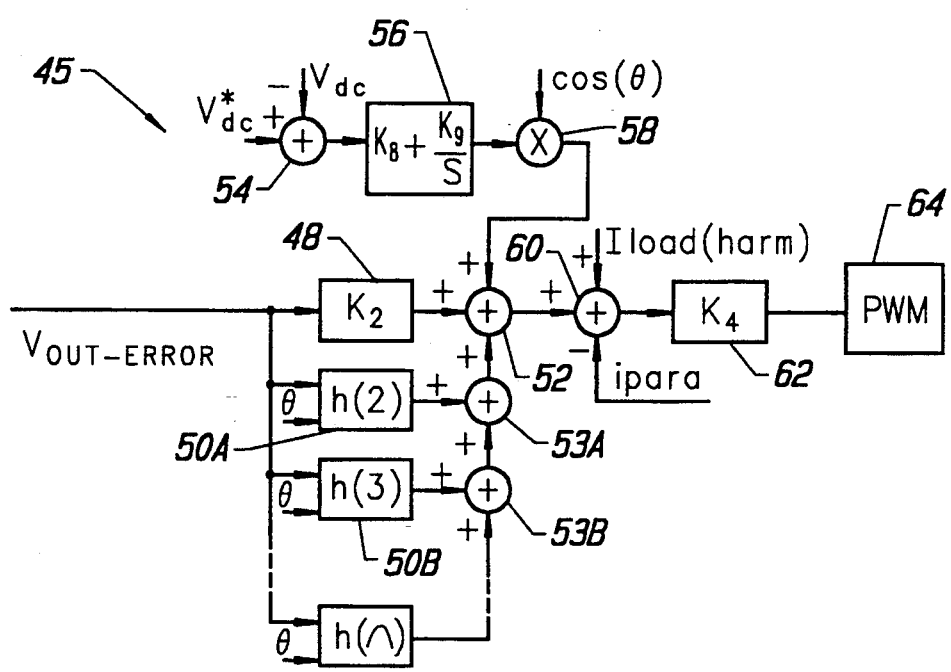
FIG. 6 depicts a parallel filter controller utilizing harmonic controllers in accordance with the invention.

FIG. 6 depicts a parallel filter controller 45 incorporating the harmonic controllers of the invention. The parallel filter controller 45 receives the voltage error output signal ($V_{out-error}$) and processes it with a proportional gain unit 48 to provide stability and damping. In a preferred embodiment of the invention, the error signal is generated using the inverse of the actual output voltage, as will be more fully described below. In addition, the error signal is conveyed to a number of harmonic controllers 50, which will be more fully described below.

The outputs of the harmonic controllers 50 are summed with addition units 53. Addition unit 52 is used to add the sum of all outputs of the harmonic controllers 50 with the output of the proportional gain unit 48. The addition unit 52 is also used to add a dc-link error voltage signal. The dc-link error voltage signal provides a signal which maintains the dc-link voltage. Prior. art techniques may be used to derive this signal. For instance, the present dc-link voltage value $V_{dc}$ may be compared with a dc-link reference voltage $V_{dc*}$. The resultant error signal may be processed by a proportional-integral unit 56. The output of the proportional-integral unit 56 may then be multiplied by a cosine reference signal, in synchronism with the input voltage, which will be further discussed below.

Additional reference signals may also be processed by the parallel filter controller 45. The output of adder 52 may be summed at adder 60 with a load current harmonic signal ($i_{load-harmonic}$) and a parallel inverter reference signal ($i_{para}$). The output of adder 60 may be processed by a proportional gain unit 62, the output of which is conveyed to a pulse width modulator 64 which drives the solid state devices of the parallel inverter 43.

The present invention is directed to a portion of the reference signal supplied to the pulse width modulator 64. More particularly, the invention is directed toward providing a reference signal fragment which controls selected harmonic amplitude and phase errors experienced at the nonlinear load 41. The reference signal fragment of the invention corresponds to a signal opposite the sense of the unwanted harmonic in the output. Thus, when the pulse width modulator 64 processes the reference signal, the unwanted harmonic components are cancelled.

Figure 7:
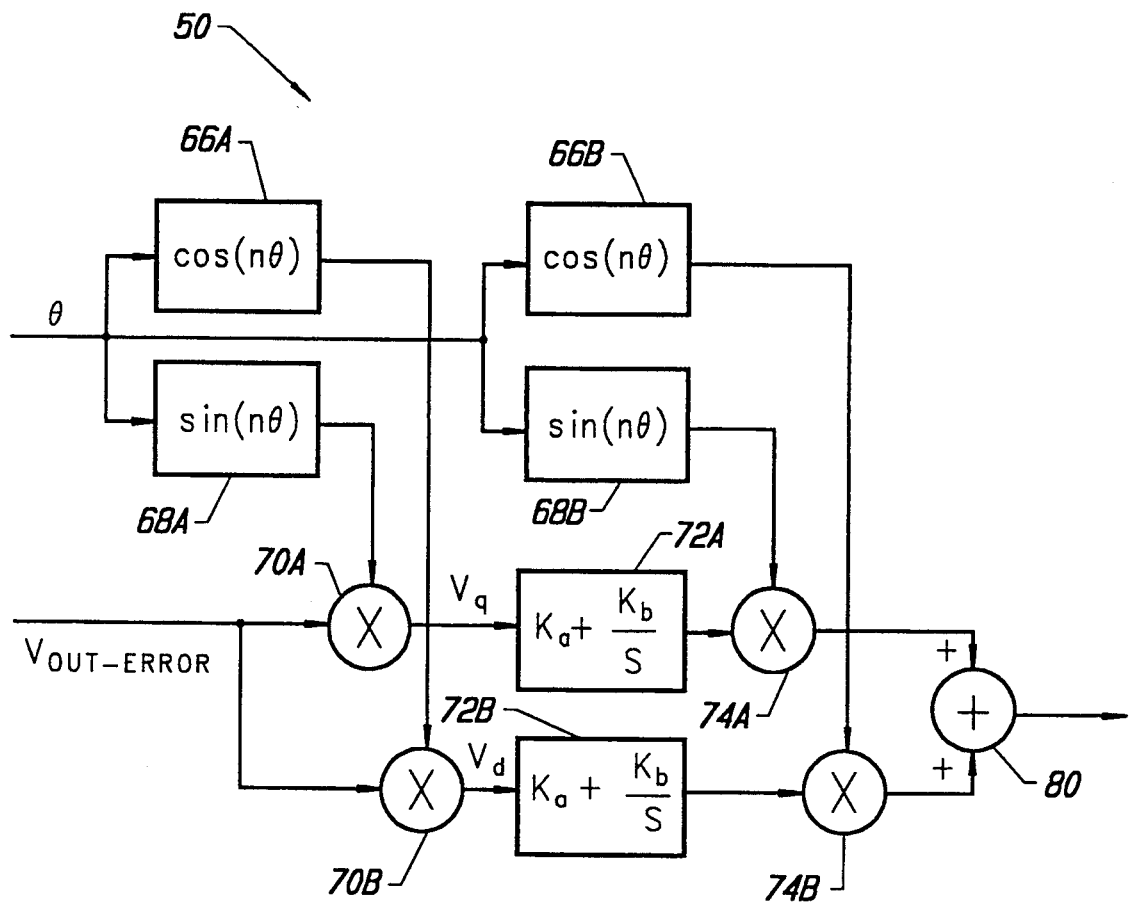
FIG. 7 depicts an analog embodiment of a harmonic controller in accordance with the invention.

FIG. 7 provides an analog representation of a harmonic controller 50 in accordance with the invention. This characterization of the invention is for the purpose of illustration, the preferred embodiment of the invention is practiced in a digital format, as will be described below.

In FIG. 7, the voltage output error signal ($V_{out-error}$) is deconstructed into direct and quadrature voltage error components by respectively multiplying it with selected harmonics of cosine and sine reference signals. The direct and quadrature voltage error components contain orthogonal dc components corresponding to the direct and quadrature magnitudes at the selected harmonic frequency.

The cosine reference signal is generated by a cosine signal reference source 66A and the sine reference signal is generated by the sine signal reference source 68A. These reference signals are applied through multipliers 70. The outputs of the multipliers 70 are conveyed to proportional-integral quadrature voltage error amplifier 72A and proportional-integral direct voltage error amplifier 72B. The error amplifiers 72 boost the dc component magnitude values of the direct and quadrature error components.

The gains Ka and kb may be different for different harmonics to optimize transient response and stability. Note that the error amplifiers 72 do not have reference inputs, this follows because they serve to null harmonics.

The outputs of the error amplifiers 72 are respectively multiplied by selected harmonic components of sine and cosine reference signals. This provides the proper phase values for the respective quadrature and direct error components at the selected harmonic frequency. These components are then summed at summer 80 to yield an output signal which corresponds to a signal which is equal and opposite of a selected harmonic. In this way, a harmonic controller 50 is constructed for each harmonic which is to be eliminated.

Figure 8:
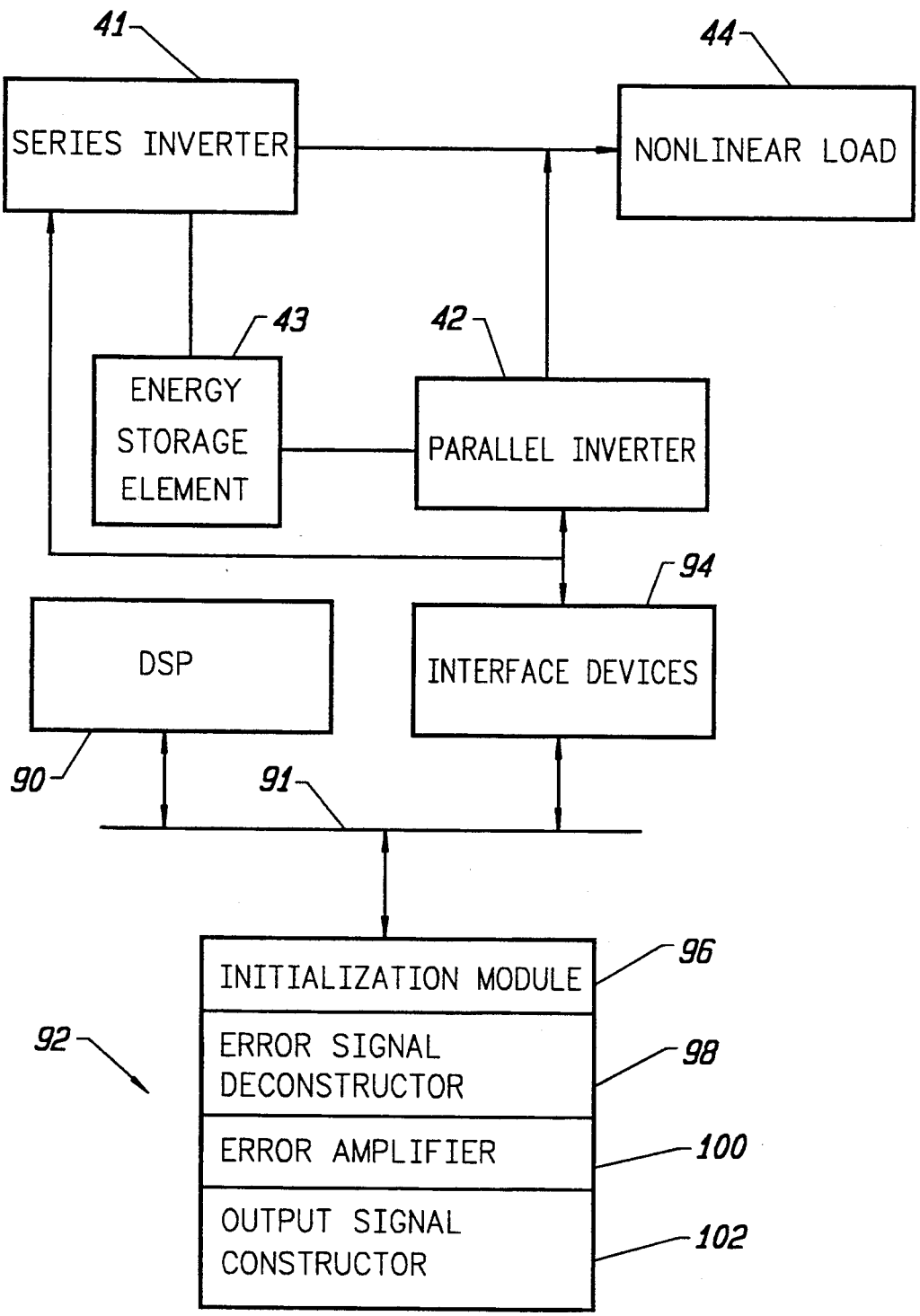
FIG. 8 depicts elements which may be used in a digital embodiment of the invention.

The foregoing description of the invention is more fully appreciated with reference to FIG. 8, which depicts a digital embodiment of the invention. The apparatus of FIG. 8 includes a digital signal processor (DSP) 90 which is coupled through a bus 91 to a memory unit 92, which may be any combination of RAM, ROM, or other memory medium. The DSP 90 is also coupled to interface devices 94 which are used to interact with the active power line conditioner elements discussed in relation to FIG. 5. As used herein, interface devices 94 include analog-to-digital converters, digital-to--analog converters, and may include keyboards, monitors, printers, and other equipment to provide an interface between a user of the digital equipment (DSP and memory), and an interface between the digital equipment and the analog components (series inverter 42, energy storage element 46, parallel inverter 44).

The interaction between a DSP 90, a memory unit 92, and interface devices 94 is known in the art. The present invention is directed toward execution of the program modules within the memory unit 92. In particular, as will be described below, DSP 90 executes a number of program modules constituting the harmonic controller 50, including: initialization module 96, error signal deconstructor 98, error amplifier 100, and output signal constructor 102. In short, these modules process the output voltage error signal to generate a harmonic cancelling reference signal which is applied through interface devices 94 to the parallel inverter 42.

The output voltage error signal is multiplied by specified components of cosine and sine reference signals to divide it into direct and quadrature error signals. The direct and quadrature signals are proportional to the dc magnitude of the specified components of the reference signals at the specified phase. The direct error signal is added to a cosine integrator error sum, and the quadrature error signal is added to a sine integrator error sum.

The direct error signal is generated by multiplying it with a gain factor and adding the product to the product of another gain factor and the cosine integrator error sum. The sum of these products is a filtered direct error signal. Similarly, the quadrature error signal is generated by multiplying it with a gain factor and adding the product to the product of another gain factor and the sine integrator error sum to produce a filtered quadrature error signal.

The sum of the amplified direct error signal and the amplified quadrature error signal is the output signal which is used to cancel the selected harmonic of interest. The methodology is then repeated for each harmonic of interest.

These processing steps may be realized with the digital apparatus of FIG. 8. The individual processing components of the invention are disclosed in the form of pseudo code. The initialization module 96 serves to clear variables, and later increment variables. As suggested by the foregoing description of the invention, a number of variables and constants are associated with the method of the invention. First, a predetermined number of sampled values of the voltage error signal must be defined. As used herein, this constant term will be defined as "k". The particular harmonic of interest must also be identified. The individual harmonic value will be identified as "n". A variable must also be defined for the cosine integration sum; this variable will be defined as "cosine_integrator". Similarly, a variable must be defined for the sine integration sum; this variable will be defined as "sine_integrator".

The foregoing variables are initialized through the initialization module 96 which may be formed as follows:

(a) k=x
(b) n=y
(c) cosine_integrator:=0
(d) sine_integrator:=0

The next component associated with the invention is the error signal de-constructor 98, which may be defined in pseudo code as follows:

(e) cosine_error:=cos(2*π*n*i/k) * error_signal
(f) cosine_integrator:=cosine_integrator+cosine_error
(g) sine_error:=sin(2*π*n*i/k) * error_signal
(h) sine_integrator:=sine_integrator+sine_error As described in line (e), the cosine_error signal is obtained by multiplying the output voltage error signal by a cosine reference term. More particularly, a selected harmonic "n" of the cosine term is multiplied by the error signal. The ratio i/k proportions the selected sample "i" to the total number of samples "k" in the defined sample set. The cosine_error value represents the orthogonal dc magnitude of the quadrature component of the input signal at the selected harmonic frequency.

As indicated in line (f), the cosine_error term is then added to a running sum of error terms (cosine_integrator). This sum is used as an accumulating function as will be described below.

The same processing is then performed to obtain a sine_error value representing the orthogonal dc magnitude of the direct component of the input signal at the selected frequency. In addition, an accumulating function is maintained (sine_integrator) by summing the sine_error terms.

An error amplifier 100 is invoked at this processing point. The error amplifier 100 may defined by the following pseudo code:

(i) cosine_amplified_value:=cos(2*π*n*i/k) * (Ka*cosine_error+Kb*cosine_integrator)
(j) sine_amplified_value:=sin(2*π*n*i/k) * (Ka*sine_error+Kb*sine_integrator)

Line (i) of the pseudo code indicates that the filtered quadrature value (cosine_amplified_value) is obtained by multiplying a selected harmonic cosine term by the sum of two filtered terms. In particular, the first term, the cosine_error signal, is multiplied by a gain value Ka, and the second term, cosine_integrator, is multiplied by a Kb gain value. The gain value may be selected for optimal processing of the harmonic of interest.

Thus, the originally derived cosine_error signal, corresponding to the magnitude of the dc component of the quadrature component of the input voltage error signal, is processed with a gain factor. In addition an integration factor is added to it, to provide an accumulation function for the output. In other words, the magnitude of the dc component is subjected to an accumulation function. At the same time, by multiplying the cosine_error signal by an instantaneous cosine value with a harmonic of interest, the proper phase for the harmonic of interest is obtained in the output voltage. In sum, the quadrature component of the voltage error signal corresponds to the amplitude and phase of the quadrature component of the harmonic which is to be cancelled. Analogous processing is done for the sine term to obtain the direct component of the amplitude and phase of the harmonic to be cancelled.

The output signal constructor 102 merely adds the sine_accumulated value and the cosine_accumulated_value:

(k) output_signal:=sine_accumulated_value+-cosine_accumulated_value

Thus, the output signal includes the processed direct and quadrature components of the voltage error signal. More particularly, the output signal represents an error signal which when processed by pulse width modulator 68, will create a signal which is substantially equal and opposite to the harmonic of interest. In other words, the output signal will cancel the harmonic of interest. This processing is repeated for each harmonic to be cancelled.

Initialization tasks must be performed prior to subsequent processing. The following additional code for the initialization module 96 may be used:

(l) i:=i+1
(m) i:=i mod k

The instruction in line (l) merely increments a counting variable. The instruction in line (m) resets the index, i, to zero to point back to the beginning of the cosine and sine references at the end of a fundamental cycle.

As previously described in relation to FIG. 5, the parallel filter controller 45 incorporating the harmonic controllers of the invention, may be used in conjunction with a number of other physical elements. Attention therefore briefly turns to those additional elements.

Figure 9:
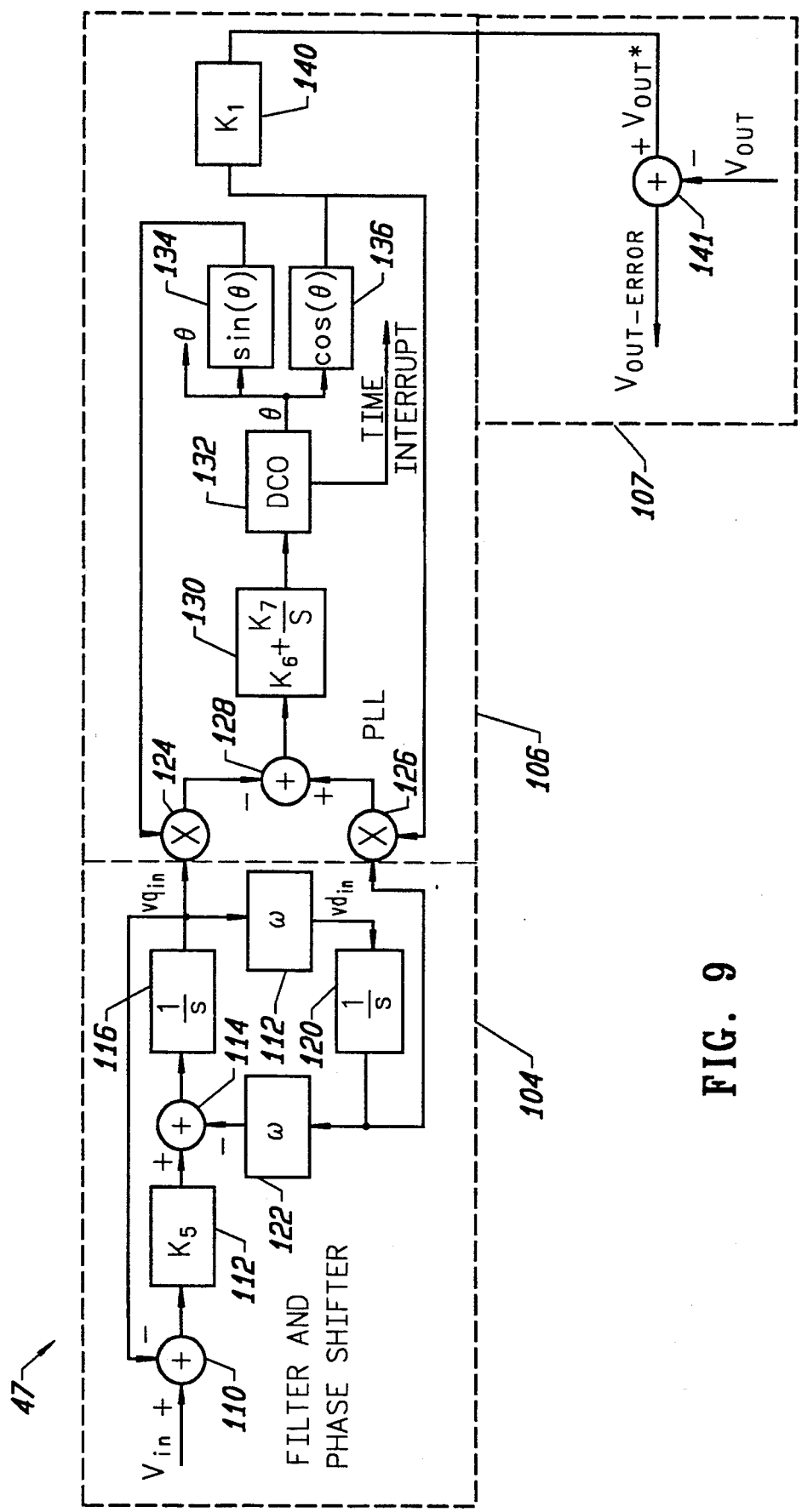
FIG. 9 depicts a voltage output error signal constructor which may be used in accordance with the invention.

FIG. 9 depicts a voltage output error signal constructor 47 which may be used in accordance with the invention. One skilled in the art will recognize a number of ways to provide a voltage output reference signal (Vout*). The apparatus of FIG. 9 is merely one embodiment which may be successfully used with the invention. The error signal constructor 47 includes a filter and phase shifter 104, a phase-locked loop 106, and a signal subtractor 107. By way of overview, the phase shifter 104 and phase-locked loop 106 generate a quadrature set of sine waves and an angular reference signal (cosine Θ) in synchronism with the input line voltage. The signal subtractor 107 subtracts the instantaneous output voltage from the synchronous angular reference signal (cosine Θ).

The filter and phase shifter 104 receives the input voltage Vin and compares it at adder 110 to the quadrature component of the input voltage (Vqin). The resultant error signal is processed by proportional gain unit 112, the output of which is sent to an adder 114. The other input to the adder 114 is a 180 degree shifted quadrature component which is subtracted at the adder. The integrator 116 provides a smoothed quadrature voltage output. The proportioning element 118 is used to remove the omega term which is generated by the integrator 116. Integrator 120 is used to obtain the direct component of the voltage input signal (Vdin).

The direct (Vdin) and quadrature (Vqin) components generated by the phase shifter 104 are conveyed to phase-locked loop 106. The phase-locked loop 106 multiplies the input values, with multipliers 124 and 126, by instantaneous sine and cosine values from look-up table 134 and 136. The negative product of multiplier 124 is added to the product of multiplier 126 at adder 128. The output of the adder 128 is processed by proportional-integral unit 130, and the output is conveyed to a digitally controlled oscillator 132 to determine the count parameter. The timer count value is decremented from the count parameter value at a constant rate, when zero is reached the sin e and cos e pointers in the look-up table are incremented, thereby yielding new values.

The output of the cosine look-up table, in other words, the cosine component of the voltage error signal is used as the voltage reference signal because it is synchronous with the input voltage. This signal is preferably processed by proportional gain unit 140 and the output is conveyed to adder 141. Note that the negative of the voltage output is used at the adder 141. As previously described, this allows the harmonic controller to develop reference signals which are substantially equal and opposite of the harmonics to be cancelled. The output of the adder 141 is the voltage output error signal ($V_{out-error}$), which is processed in a manner previously described.

Figure 10:
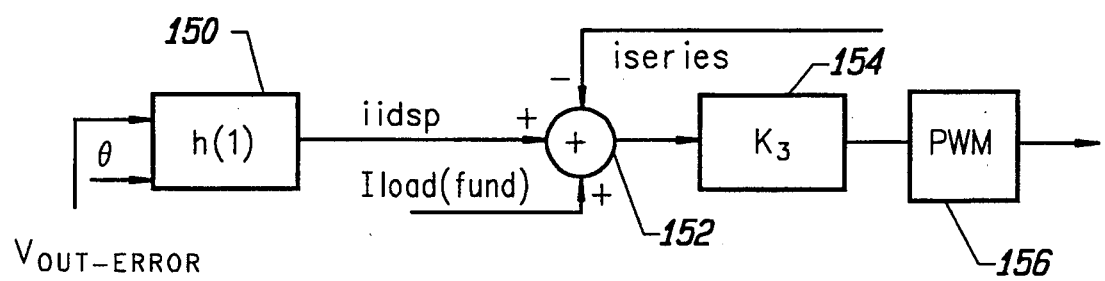
FIG. 10 depicts a series filter controller which may be used in accordance with the invention.

FIG. 10 depicts a series filter controller 46 which may be used in accordance with the invention. The particular controller of FIG. 10 is merely illustrative of an apparatus which may be used with the invention. The voltage output error signal is applied to the proportional gain unit 150. The output of this device is conveyed to adder 152 which mixes the voltage output error signal with the negative of the series inverter current and a load current fundamental signal ($i_{load-fund}$). The output of the adder 152 is conveyed to a proportional gain unit 154 whose output is conveyed to a pulse width modulator 156 which drives the gates of the series filter 42.

One skilled in the art will recognize that the techniques described herein are not limited to nulling amplitude and phase errors at selected harmonics. The techniques may also be used to deliberately inject selected harmonics for testing purposes or specialized equipment. If one selects the fundamental frequency ("n"=1), then the harmonic controller of the invention will provide a load current fundamental signal which may be used as a reference signal in the series filter controller 46, or for other purposes. It is possible to connect the invention's harmonic controllers in series and combine the output transformation of one harmonic controller with the input transformation of the successive controller. Naturally, the harmonic controller of the invention may also be used to control current harmonics.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

I claim:

1. An apparatus to construct a sinusoidal output signal corresponding to a plurality of selected harmonics of a sinusoidal input signal, said apparatus comprising:

means for dividing said sinusoidal input signal into a plurality of direct component signals corresponding to said plurality of selected harmonics and a plurality of quadrature component signals corresponding to said selected harmonics;

first means for controlling said plurality of direct component signals by applying a gain factor to said plurality of direct component signals and by adding an accumulating functional term, corresponding to a running sum of error terms for said sinusoidal input signal, to said plurality of direct component signals to produce a plurality of accumulated direct component signals with amplitudes corresponding to the magnitudes of said selected harmonic components;

second means for controlling said plurality of quadrature component signals by applying a gain factor to said plurality of quadrature component signals and by adding an accumulating functional term, corresponding to a running sum of error terms of said sinusoidal input signal, to said plurality of quadrature component signals to produce a plurality of accumulated quadrature component signals with amplitudes corresponding to the magnitude of said selected harmonic components;

first means for multiplying said accumulated direct component signals by said plurality of selected harmonic components of a cosine reference signal to provide a plurality of amplified direct component signals with phase values corresponding to said plurality of selected harmonics of said input signal;

second means for multiplying said accumulated quadrature component signals by said plurality of predetermined harmonic components of a sine reference signal to provide a plurality of amplified quadrature component signals with phase values corresponding to said plurality of selected harmonics of said input signal; and means for adding said amplified direct component signals and said amplified quadrature component signals to form said output signal corresponding to said plurality of selected harmonics of said sinusoidal input signal.

2. A method of constructing a sinusoidal output signal corresponding to a selected harmonic of a sinusoidal input signal, said method comprising the steps of:

(A) dividing said sinusoidal input signal into a direct component signal corresponding to said selected harmonic component and a quadrature component signal corresponding to said selected harmonic component;

(B) controlling said direct component signal by applying a gain factor to said direct component signal and by adding an accumulating functional term, corresponding to a running sum of error terms of said sinusoidal input signal, to said direct component signal to produce an accumulated direct component signal with an amplitude corresponding to said selected harmonic component magnitude;

(C) controlling said quadrature component signal by applying a gain factor to said quadrature component signal and by adding an accumulating functional term, corresponding to a running sum of error terms of said sinusoidal input signal, to said quadrature component signal to produce an accumulated quadrature component signal with an amplitude corresponding to said selected harmonic component magnitude;

(D) multiplying said accumulated direct component signal by said selected harmonic component of a cosine reference signal to provide an amplified direct component signal with a phase value corresponding to said input signal;

(E) multiplying said accumulated quadrature component signal by said predetermined harmonic component of a sine reference signal to provide an amplified quadrature component signal with a phase value corresponding to said input signal;

(F) adding said amplified direct component signal and said amplified quadrature component signal to form said output signal; and (G) repeating steps (A) through (F) for a plurality of selected harmonics.

3. The apparatus of claim 1 wherein said sinusoidal input signal is a voltage error signal.

4. The apparatus of claim 1 further comprising means for adding a dc-link error voltage signal to said output signal.

5. The apparatus of claim 1 further comprising means for adding a load current harmonic signal to said output signal.

6. The apparatus of claim 1 further comprising means for adding a parallel inverter reference signal to said output signal.

7. The apparatus of claim 1 further comprising a pulse width modulator for receiving said output signal and generating a pulse width modulated signal; and a parallel inverter coupled to said pulse width modulator and processing said pulse width modulated signal.

8. The method of claim 2 wherein said sinusoidal input signal is a voltage error signal.

9. The method of claim 2 further comprising the step of adding a dc-link error voltage signal to said output signal.

10. The method of claim 2 further comprising the step of adding a load current harmonic signal to said output signal.

11. The method of claim 2 further comprising the step of adding a parallel inverter reference signal to said output signal.

12. The method of claim 2 further comprising the steps of:

conveying said output signal to a pulse width modulator to generate a pulse width modulated signal; and processing said pulse width modulated signal with a parallel inverter.

* * * * *